United States Patent
Portolese et al.

(10) Patent No.: US 9,140,190 B2
(45) Date of Patent: Sep. 22, 2015

(54) GAS TURBINE ENGINE FUEL METERING VALVE ADAPTED TO SELECTIVELY RECEIVE FUEL FLOW INCREASE/DECREASE COMMANDS FROM THE ENGINE CONTROL AND FROM THE BACK-UP FUEL CONTROL

(75) Inventors: Larry Portolese, Granger, IN (US);
Gregory Kline, South Bend, IN (US);
Paul W. Futa, North Liberty, IN (US);
David Tuttle, South Bend, IN (US);
Brad McRoberts, Mishawaka, IN (US);
Greg Lafferty, Plymouth, IN (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 762 days.

(21) Appl. No.: 13/490,169

(22) Filed: Jun. 6, 2012

(65) Prior Publication Data

US 2013/0327044 A1 Dec. 12, 2013

(51) Int. Cl.
*F02C 7/232* (2006.01)
*F02C 9/26* (2006.01)
*F16K 31/42* (2006.01)

(52) U.S. Cl.
CPC ............... *F02C 7/232* (2013.01); *F02C 9/263* (2013.01); *F16K 31/42* (2013.01); *Y10T 137/87096* (2015.04)

(58) Field of Classification Search
CPC .......... F16K 31/42; F02C 7/232; F02C 9/263; Y10T 137/87096
USPC ...................... 251/26, 30.01; 60/734, 39.281
See application file for complete search history.

(56) References Cited

U.S. PATENT DOCUMENTS

| | | | |
|---|---|---|---|
| 2,628,472 A | 2/1953 | Dray et al. | |
| 3,808,801 A | 5/1974 | Taylor | |
| 3,946,551 A | 3/1976 | Linebrink et al. | |
| 4,256,017 A | 3/1981 | Eastman | |
| 4,300,347 A * | 11/1981 | Smith | 60/39.281 |
| 4,342,443 A | 8/1982 | Wakeman | |
| 4,386,553 A | 6/1983 | Thoman et al. | |
| 4,640,093 A | 2/1987 | Eastman | |
| 4,951,459 A | 8/1990 | McCarty | |

(Continued)

FOREIGN PATENT DOCUMENTS

GB 2305975 A 4/1997

OTHER PUBLICATIONS

Pratt & Whitney A United Technologies Company, Flight Operations Support; Operating Instructions for the PW4000 Series Commercial Turbofan Engines in the A300-600 and A310 Airplanes; Nov. 15, 1993 Revision 8—Jun. 30, 2008.

*Primary Examiner* — William H Rodriguez
(74) *Attorney, Agent, or Firm* — Ingrassia Fisher & Lorenz, P.C.

(57) ABSTRACT

A system provides "fail fixed" functionality and allows a user to manually manipulate fuel flow to a gas turbine engine in the unlikely event the primary control means is unavailable. The fuel metering unit includes a fuel metering valve, a flow increase valve, and a flow decrease valve. The flow increase valve and flow decrease valves are both in fluid communication with the fuel metering valve and are each adapted to selectively receive fuel flow commands from a primary fuel flow command source and from a secondary fuel flow command source. The flow increase and decrease valves are responsive to the fuel flow commands to selectively control the position of the fuel metering valve.

20 Claims, 3 Drawing Sheets

(56) References Cited

U.S. PATENT DOCUMENTS

| | | | |
|---|---|---|---|
| 6,205,766 B1 * | 3/2001 | Dixon et al. | 60/39.091 |
| 6,381,946 B1 * | 5/2002 | Wernberg et al. | 60/39.281 |
| 6,912,837 B2 | 7/2005 | Demers | |
| 6,996,969 B2 | 2/2006 | Dalton | |
| 7,526,911 B2 | 5/2009 | Pickard et al. | |
| 7,836,676 B2 * | 11/2010 | Futa et al. | 60/39.281 |
| 2002/0078693 A1 * | 6/2002 | Maillard et al. | 60/773 |
| 2007/0234732 A1 * | 10/2007 | Shelby et al. | 60/772 |
| 2010/0293919 A1 * | 11/2010 | Poisson et al. | 60/39.281 |
| 2011/0173988 A1 | 7/2011 | Sweet et al. | |
| 2012/0067022 A1 * | 3/2012 | Futa et al. | 60/39.281 |
| 2012/0261000 A1 * | 10/2012 | Futa et al. | 137/101 |
| 2012/0266600 A1 * | 10/2012 | Bader et al. | 60/734 |

\* cited by examiner

GAS TURBINE ENGINE FUEL METERING VALVE ADAPTED TO SELECTIVELY RECEIVE FUEL FLOW INCREASE/DECREASE COMMANDS FROM THE ENGINE CONTROL AND FROM THE BACK-UP FUEL CONTROL

TECHNICAL FIELD

The present invention generally relates to gas turbine engine fuel control, and more particularly to a back-up control system for a gas turbine engine fuel metering valve.

BACKGROUND

Typical gas turbine engine fuel supply systems include a fuel source, such as a fuel tank, and one or more pumps that draw fuel from the fuel tank and deliver pressurized fuel to the fuel manifolds in the engine combustor via a main supply line. The main supply line may include one or more valves in flow series between the pumps and the fuel manifolds. These valves generally include at least a main metering valve and a pressurizing-and-shutoff valve downstream of the main metering valve. In addition to the main supply line, many fuel supply systems may also include a bypass flow line connected upstream of the metering valve that bypasses a portion of the fuel flowing in the main supply line back to the inlet of the one or more pumps, via a bypass valve. The position of the bypass valve is controlled to maintain a substantially fixed differential pressure across the main metering valve.

Many aircraft include an engine controller, such as a FADEC (Full Authority Digital Engine Controller), to control engine operation and the fuel supply system. Typically, the engine controller receives various input signals from the engine and aircraft, and a thrust setting from the pilot. In response to these input signals, the engine control system may modulate the position of the above-described fuel metering valve to control the fuel flow rate to the engine fuel manifolds to attain and/or maintain a desired thrust, or, in the case of a turbo prop or turbo shaft engine, a desired speed.

Fuel supply and engine control systems, such as the one described above, may experience certain postulated events that may result in certain postulated failure modes, which in turn may result in certain postulated effects. For example, one particular postulated event is a loss of power. To accommodate this postulated event, the engine control system is typically designed such that, in the highly unlikely occurrence of a loss of power, the fuel metering valve "fails fixed." That is, the fuel metering valve will remain in the position it was in when the postulated loss of power event occurs. As a result, fuel flow to the engine will remain at the flow rate that was commanded with then postulated loss of power event occurs.

Although the above-described "fail fixed" configuration is generally safe and reliable, it is additionally desirable that the pilot be provided with a means to manually manipulate fuel flow to the engine during the loss of power to the metering valve. The present invention addresses at least this need.

BRIEF SUMMARY

In one embodiment, a fuel metering unit includes a fuel metering valve, a flow increase valve, and a flow decrease valve. The fuel metering valve is adapted to receive a flow of fuel from a fuel source and has a variable area flow orifice through which fuel from the fuel source flows. The fuel metering valve additionally includes a first control port, a second control port, and a third control port. The first control port is adapted to receive hydraulic fluid at a first hydraulic fluid pressure, the second control port adapted to receive hydraulic fluid at a second hydraulic fluid pressure, and the third control port adapted to selectively receive hydraulic fluid at either the first hydraulic fluid pressure or the second hydraulic fluid pressure. The fuel metering valve is configured, in response to fluid pressure at the third control port, to selectively adjust the area of the variable area flow orifice. The flow increase valve is in fluid communication with the fuel metering valve and is adapted to receive hydraulic fluid at the first hydraulic fluid pressure. The flow increase valve is adapted to selectively receive fuel flow increase commands from a primary fuel flow command source and from a secondary fuel flow command source. The flow increase valve is responsive to the fuel flow increase commands to selectively supply hydraulic fluid at the first hydraulic fluid pressure to the third control port to thereby increase the area of the variable area flow orifice. The flow decrease valve is in fluid communication with the fuel metering valve and is adapted to receive hydraulic fluid at the second hydraulic fluid pressure. The flow decrease valve is adapted to selectively receive fuel flow decrease commands from the primary fuel flow command source and from the secondary fuel flow command source. The flow decrease valve is responsive to the fuel flow decrease commands to selectively supply hydraulic fluid at the second hydraulic fluid pressure to the third control port to thereby decrease the area of the variable area flow orifice.

In another embodiment, a gas turbine engine fuel supply system includes an engine control, a back-up fuel control, a fuel supply line, and a fuel metering unit. The engine control is operable to selectively supply fuel flow increase commands and fuel flow decrease commands. The back-up fuel control operable to selectively supply fuel flow increase commands and fuel flow decrease commands. The fuel supply line has an inlet and an outlet. The inlet is adapted to receive fuel from a fuel source, and the outlet is adapted to supply the fuel to a gas turbine engine combustor. The fuel metering unit is disposed in flow series in the fuel supply line, and is responsive to the fuel flow increase commands and the fuel flow decrease commands to control fuel flow from the fuel source to the gas turbine engine combustor. The fuel metering unit includes a fuel metering valve, a flow increase valve, and a flow decrease valve. The fuel metering valve is coupled to receive the flow of fuel from the fuel source and has a variable area flow orifice through which fuel from the fuel source flows. The fuel metering valve includes a first control port, a second control port, and a third control port. The first control port is adapted to receive hydraulic fluid at a first hydraulic fluid pressure, the second control port is adapted to receive hydraulic fluid at a second hydraulic fluid pressure, and the third control port is adapted to selectively receive hydraulic fluid at either the first hydraulic fluid pressure or the second hydraulic fluid pressure. The fuel metering valve is configured, in response to fluid pressure at the third control port, to selectively adjust the area of the variable area flow orifice. The flow increase valve is in fluid communication with the fuel metering valve and is adapted to receive hydraulic fluid at the first hydraulic fluid pressure. The flow increase valve is adapted to selectively receive fuel flow increase commands from the engine control and from the back-up fuel control. The flow increase valve is responsive to the fuel flow increase commands to selectively supply hydraulic fluid at the first hydraulic fluid pressure to the third control port to thereby increase the area of the variable area flow orifice. The flow decrease valve is in fluid communication with the fuel metering valve and is adapted to receive hydraulic fluid at the second hydraulic fluid pressure. The flow decrease valve is adapted to selectively receive fuel flow decrease commands from the engine control and from the back-up fuel control. The flow decrease valve is responsive to the fuel flow decrease commands to selectively supply hydraulic fluid at the second hydraulic fluid pressure to the third control port to thereby decrease the area of the variable area flow orifice.

In yet another embodiment, a gas turbine engine fuel supply system includes an engine control, a back-up fuel control, a fuel supply line, and a fuel metering unit. The engine control is operable to selectively supply fuel flow increase commands and fuel flow decrease commands. The back-up fuel control is electrically independent of the engine control and is adapted to receive input stimuli from a user and is configured, in response thereto, to selectively supply fuel flow increase commands and fuel flow decrease commands. The fuel supply line has an inlet and an outlet. The inlet is adapted to receive fuel from a fuel source, and the outlet is adapted to supply the fuel to a gas turbine engine combustor. The fuel metering unit is disposed in flow series in the fuel supply line, and is responsive to the fuel flow increase commands and the fuel flow decrease commands to control fuel flow from the fuel source to the gas turbine engine combustor. The fuel metering unit includes a fuel metering valve, a flow increase valve, and a flow decrease valve. The fuel metering valve is coupled to receive the flow of fuel from the fuel source and has a variable area flow orifice through which fuel from the fuel source flows. The fuel metering valve includes a first control port, a second control port, and a third control port. The first control port is adapted to receive hydraulic fluid at a first hydraulic fluid pressure, the second control port is adapted to receive hydraulic fluid at a second hydraulic fluid pressure, the third control port is adapted to selectively receive hydraulic fluid at either the first hydraulic fluid pressure or the second hydraulic fluid pressure and is configured, in response to the fluid pressure at the third control port, to selectively adjust the area of the variable area flow orifice. The flow increase valve is in fluid communication with the fuel metering valve and is adapted to receive hydraulic fluid at the first hydraulic fluid pressure. The fuel increase valve is coupled to receive fuel flow increase commands from the engine control and from back-up fuel control and is configured, in response thereto, to supply hydraulic fluid at the first hydraulic fluid pressure to the third control port to thereby increase the area of the variable area flow orifice. The flow decrease valve is in fluid communication with the fuel metering valve and is adapted to receive hydraulic fluid at the second hydraulic fluid pressure. The flow decrease valve is coupled to receive fuel flow decrease commands from the engine control and from back-up fuel control and is configure, in response thereto, to supply hydraulic fluid at the second hydraulic fluid pressure to the third control port to thereby decrease the area of the variable area flow orifice.

Furthermore, other desirable features and characteristics of the fuel metering unit and fuel supply system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
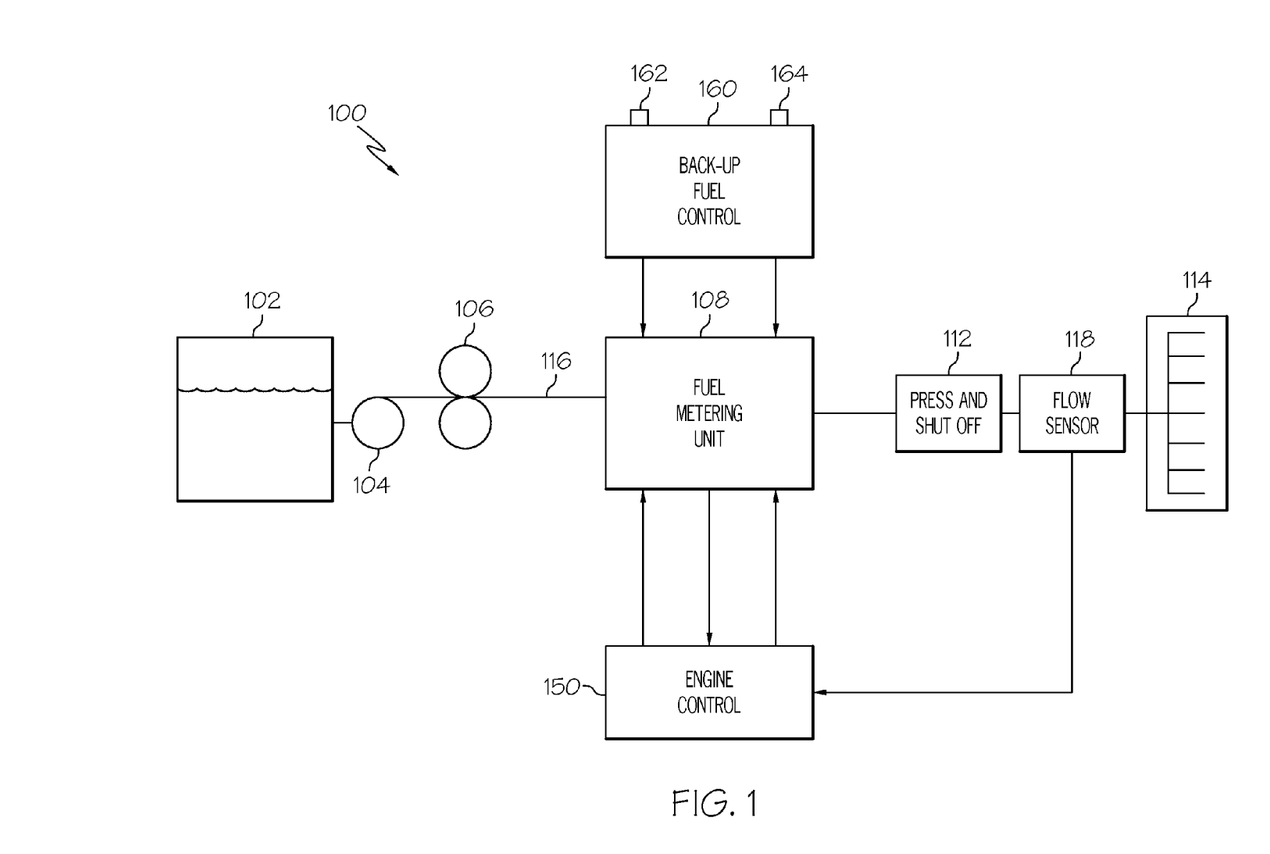
FIG. 1 is a simplified schematic diagram of an exemplary embodiment of a fuel delivery and control system for a gas turbine engine.

A simplified schematic diagram of one embodiment of a fuel delivery and control system for a gas turbine engine, such as a turbofan jet aircraft engine, is depicted in FIG. 1. The system 100 includes a fuel source 102, one or more pumps 104, 106, and a fuel metering unit 108. The fuel source 102, which is preferably implemented as a tank, stores fuel that is to be supplied to a gas turbine engine combustor 114. A supply line 116 is coupled to the fuel source 102 and, via the just-mentioned pumps 104, 106 and fuel metering unit 108, delivers the fuel to the combustor 114. It is noted that the supply line 116 is, for convenience, depicted and described with a single reference numeral. However, it will be appreciated that the system is implemented using separate sections of piping, though a single section is certainly not prohibited.

Each of the one or more pumps 104, 106 is positioned in flow-series in the supply line 116 and take a suction on the fuel source 102. In the depicted embodiment, two pumps are used and include a booster pump 104, such as a relatively low horsepower centrifugal pump, and a high pressure pump 106, such as a positive displacement pump. The booster pump 104 takes a suction directly on the fuel source 102 and provides sufficient suction head for the high pressure pump 106. The high pressure pump 106 then supplies the fuel at a relatively high pressure to the remainder of the supply line 116.

The fuel metering unit 108 is positioned in flow-series in the supply line 116 downstream of the high pressure pump 106. The fuel metering unit 108 is coupled to selectively receive fuel flow commands from two independent fuel flow command sources—a primary fuel flow command source and a secondary fuel flow command source. Although these sources may vary, in the depicted embodiment, the primary fuel flow command source is a main engine control 150 and the secondary fuel flow command source is a back-up fuel control 160. The engine control 150, which may be, for example, a Full Authority Digital Engine Controller (FADEC), is configured to control the overall operation of the gas turbine engine (or engines), including the flow of fuel from the fuel source 102 to the combustors 114 in each engine. With respect to fuel supply to the combustors 114, the engine control 150 receives various input signals and supplies fuel flow increase commands and fuel flow decrease commands to the fuel metering unit 108 to thereby control the fuel flow rate to the combustor 114. Although the engine control 150 may generate the fuel flow increase and decrease commands in various forms, in the depicted embodiment the engine control 150 generates the fuel flow increase and decrease commands as pulse width modulation (PWM) signals.

Although the back-up fuel control 160 may be variously configured, in the depicted embodiment, the back-up fuel control 160 includes a flow decrease user interface 162 and a flow increase user interface 164. The flow decrease user interface 162 and flow increase user interface 164 are each adapted to receive input stimuli from a user, such as a pilot. As will be described further below, the back-up fuel control 160 is configured to supply fuel flow decrease commands that will result in an decrease in fuel flow when input stimuli is supplied to the flow decrease user interface 162, and to supply fuel flow increase commands that will result in a increase in fuel flow when input stimuli is supplied to the flow increase user interface 164. As with the engine control 150, in the depicted embodiment the back-up fuel control 160 generates the fuel flow increase and decrease commands as pulse width modulation (PWM) signals.

No matter the specific implementations of the primary and secondary fuel flow command sources, the fuel metering unit 108 is configured, in response to the fuel flow increase and decrease commands, to control the flow of fuel to the gas turbine engine combustor 114. A more detailed description of the configuration and operation of the fuel metering unit 108, and the conditions under which it receives and responds to the fuel flow increase and decrease commands from the primary (e.g., engine control 150) or secondary (e.g., back-up fuel control 160) fuel flow command sources, will be provided further below. Before doing so, however, a description of the remainder of the depicted fuel supply system will, for completeness, be provided.

In the depicted embodiment, two additional major components are positioned in flow-series in the supply line 116 between the fuel metering unit 108 and the combustor 114. These two major components are a pressurizing and shutoff valve 112 and a flow sensor 118. The pressurizing-and-shutoff valve 112 functions to ensure a minimum system pressure magnitude is in the supply line 116 downstream of the fuel metering unit 108, and shuts when the pressure falls below this minimum pressure magnitude. The flow sensor 118 measures the fuel flow rate to the combustor 114 and generates a flow signal representative of the measured flow rate.

Although not depicted in FIG. 1, it will be appreciated that the system 100, in some embodiments may additionally include a bypass flow line. The bypass flow line, if included, is preferably connected to the supply line 116 between the high pressure pump 106 and the fuel metering unit 108, and bypasses a portion of the fuel in the supply line 116 back to the inlet of the high pressure pump 106, the inlet of the booster pump 104, or back to the fuel source 102. To do so, the bypass line may include a bypass valve that is positioned to selectively bypass fuel flow in the supply line 116 away from the fuel metering unit 108, and thus the engine combustor 114. Similar to the fuel metering unit 108, the bypass valve is preferably controlled in response to valve command supplied from the engine control 150.

Figure 2:
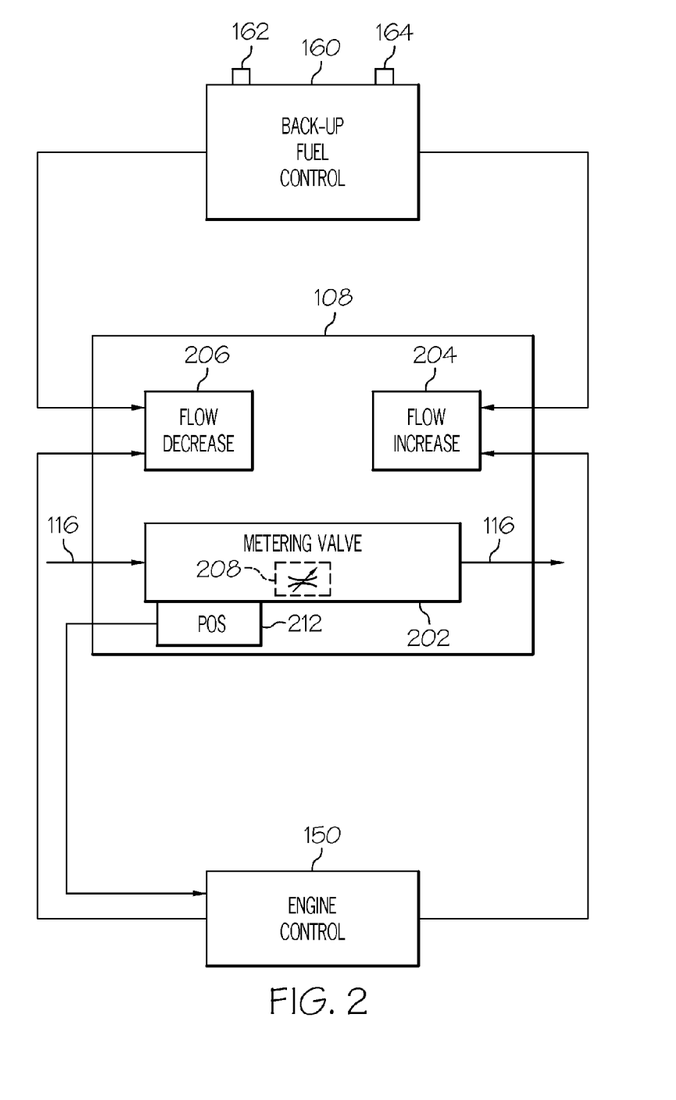
FIG. 2 is a functional block diagram of a fuel metering unit that may be used to implement the fuel delivery and control system of FIG. 1.

Turning now to FIG. 2, in which the fuel metering unit 108 is depicted in more detail in functional block diagram form, the fuel metering unit 108 will be described in more detail. The fuel metering unit 108 includes a fuel metering valve 202, a flow increase valve 204, and a flow decrease valve 206. The fuel metering valve 202 is preferably a hydraulically-operated valve that defines a variable area flow orifice 208 through which a portion of the fuel in the supply line 116 flows. As will be described in more detail further below, the area of the variable area flow orifice 208 is adjusted in response to variable pressure hydraulic fluid that is supplied thereto from the flow increase and flow decrease valves 204, 206.

As FIG. 2 also depicts, a position sensor 212 is preferably coupled to the metering valve 202. The position sensor 212 is operable to sense metering valve position and to supply a valve position signal representative thereof to the engine control 150. The position of the metering valve 202 is directly related to the area of the variable area flow orifice 208, which is directly related to the fuel flow rate to the combustor 114. The position sensor 212 is preferably a dual channel linear variable differential transformer (LVDT), but could be any one of numerous position sensing devices known in the art. For example, the position sensor 212 could be a rotary variable differential transformer (RVDT), an optical sensor, or a float-type sensor, just to name a few.

The flow increase valve 204 and the flow decrease valve 206 are each in fluid communication with the fuel metering valve 202, and are each coupled to receive hydraulic fluid. The flow increase valve 204 is coupled to receive hydraulic fluid at a first fluid pressure from a non-illustrated first hydraulic fluid source, and the flow decrease valve 206 is coupled to receive hydraulic fluid at a second pressure from a non-illustrated second hydraulic fluid source. In one particular embodiment the first hydraulic fluid source is a relatively low pressure hydraulic fluid source such as, for example, the booster pump 104 discharge, and the second hydraulic fluid source is a regulated pressure supplied from the fuel supply line inlet to the fuel metering unit 108. No matter the specific sources of the hydraulic fluid supplied to the flow increase and flow decrease valves 204, 206, it will be appreciated that the first fluid pressure is less than the second fluid pressure.

The flow increase valve 204 and the flow decrease valve 206 are also each operable to selectively couple the fuel metering valve 202 to the first hydraulic fluid source and the second hydraulic pressure source, respectively, to thereby vary the area of the variable area flow orifice 208. More specifically, the flow increase valve 204 is responsive to the above-mentioned fuel flow increase commands to fluidly communicate hydraulic fluid at the first hydraulic fluid pressure to the fuel metering valve 202. The configuration of the fuel metering valve 202 and the first hydraulic fluid pressure will cause the area of the variable area flow orifice 208 to increase, and thus the flow rate of fuel to the combustor 114 to increase. Similarly, the flow decrease valve 206 is responsive to the above-mentioned fuel flow decrease commands to supply hydraulic fluid at the second hydraulic fluid pressure to the fuel metering valve 202. The configuration of the fuel metering valve 202 and the second hydraulic fluid pressure will cause the area of the variable area flow orifice 208 to decrease, and thus the flow rate of fuel to the combustor 114 to decrease.

Figure 3:
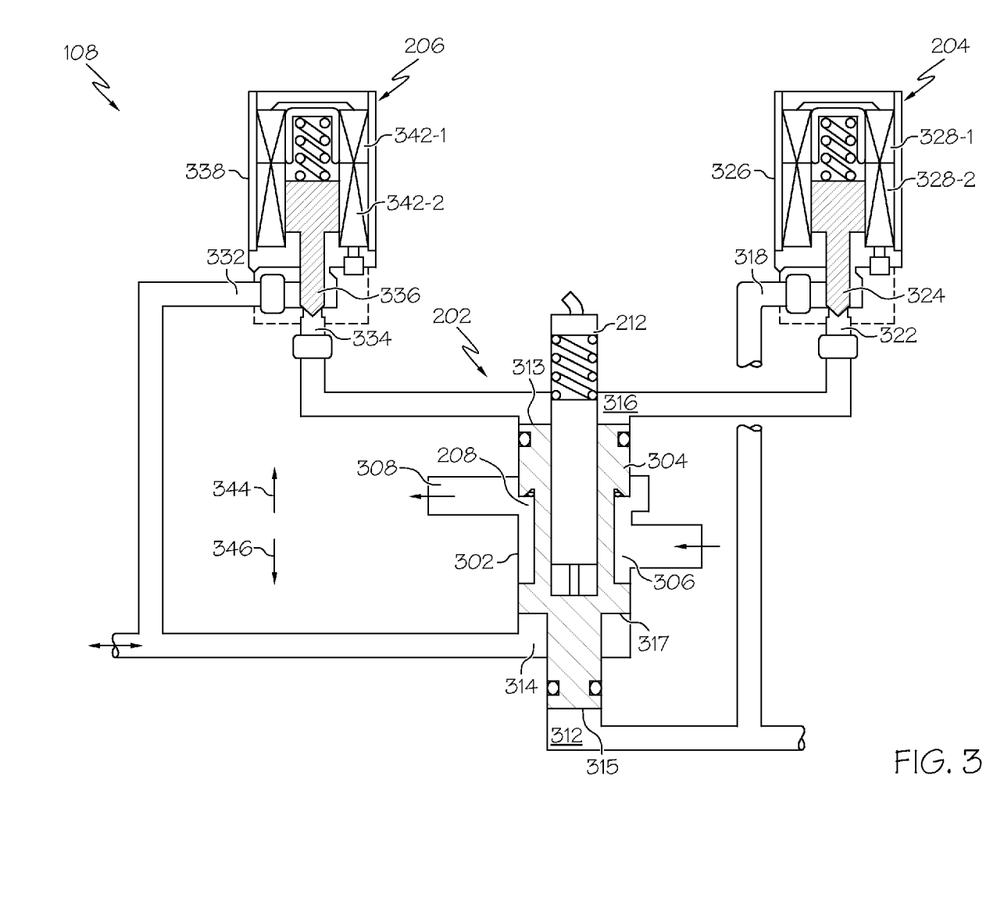
FIG. 3 is a detailed schematic diagram of the fuel metering unit of FIG. 2, depicting its configuration when electrical power is being supplied thereto.

Turning now to FIG. 3, a more detailed schematic diagram of a particular physical implementation of the fuel metering unit 108 is depicted and will be described. In the depicted embodiment it is seen that the fuel metering valve 202 includes a valve body 302 and a valve element 304. The valve body 302 includes a fuel inlet port 306, a fuel outlet port 308, a first control port 312, a second control port 314, and a third control port 316. The fuel inlet port 306 is coupled to receive the flow of fuel from the fuel source 102, via the pump 106, and the fuel outlet port 308 is in fluid communication with the pressurizing and shutoff valve 112. The metering valve first control port 312 is coupled to receive hydraulic fluid at the first hydraulic fluid pressure, and the metering valve second control port 314 is coupled to receive hydraulic fluid at the second hydraulic fluid pressure. The metering valve third control port 316 is coupled to both the flow increase valve 204 and the flow decrease valve 206 and, as will be described momentarily, selectively receives hydraulic fluid at either the first or second hydraulic fluid pressures.

The valve element 304 is disposed within the valve body 302 and together the valve element 304 and valve body 302 define the variable area flow orifice 208. The valve element 304 is movable within the valve body 302 to vary the area of the variable area flow orifice 208, to thereby control the flow of fuel to the engine combustor 114. In particular, the valve element 304 is configured to move in response to the overall differential fluid pressure acting on the valve element 304 from the hydraulic fluid supplied to the metering valve first, second, and third control ports 312, 314, 316. More specifically, and as FIG. 3 additionally depicts, the valve element 304 includes a first end 313, a second end 315, and an annular control surface 317. Preferably, the cross sectional areas of the valve element second end 315 and the annular control surface 317 are approximately equal, with each being half the area of first end 313. The above-mentioned position sensor 212 is also depicted as being coupled to the valve element 304.

The flow increase valve 204 includes a first flow port 318, a second flow port 322, a flow increase valve element 324, and a flow increase valve actuator 326. The flow increase valve first flow port 318 is coupled to receive hydraulic fluid at the first hydraulic fluid pressure from the above-mentioned, non-illustrated first hydraulic fluid source, and the flow increase valve second flow port 322 is in fluid communication with the fuel metering valve third control port 316. The flow increase valve element 324 is disposed between the flow increase valve first and second flow ports 318, 322 and is movable between a closed position and an open position. When the flow increase valve element 324 is in the closed position, which is the position depicted in FIG. 3, the flow increase valve first flow port 318 is fluidly isolated from the flow increase valve second flow port 322. Conversely, when the flow increase valve element 324 is in an open position, the flow increase valve first flow port 318 is in fluid communication with the flow increase valve second flow port 322.

The flow increase valve element 324 is moved between the closed and open positions by the flow increase valve actuator 326. The flow increase valve actuator 326 is coupled to the flow increase valve element 324 and is coupled to selectively receive the previously described fuel flow increase commands. The flow increase valve actuator 326, in response to the fuel flow increase commands, selectively moves the flow increase valve element 324 to either the closed position or an open position. The flow increase valve actuator 326 may be implemented using any one of numerous types of actuators, including any one of numerous types of electromechanical, electro-pneumatic, and electro-hydraulic actuators. In the depicted embodiment, however, it is implemented using a spring-loaded, dual-coil solenoid that includes a primary increase valve coil 328-1 and a secondary increase valve coil 328-2.

The flow decrease valve 206 is configured substantially similar to the flow increase valve 204, and thus also includes a first flow port 332, a second flow port 334, a flow decrease valve element 336, and a flow decrease valve actuator 338. The flow decrease valve first flow port 332 is coupled to receive hydraulic fluid at the second hydraulic fluid pressure from the above-mentioned second hydraulic fluid source, and the second flow port 334 is in fluid communication with the fuel metering valve third control port 316. The flow decrease valve element 336 is disposed between the flow decrease valve first and second flow ports 332, 334 and is movable between a closed position and an open position. When the flow decrease valve element 336 is in the closed position, which is the position depicted in FIG. 3, the flow decrease valve first flow port 332 is fluidly isolated from the flow decrease valve second flow port 334. Conversely, when the flow decrease valve element 336 is in an open position, the flow decrease valve first flow port 332 is in fluid communication with the flow decrease valve second flow port 334.

The flow decrease valve element 336 is moved between the closed and open positions by the flow decrease valve actuator 338. The flow decrease valve actuator 338 is coupled to the flow decrease valve element 336 and is coupled to selectively receive the previously described fuel flow decrease commands. The flow decrease valve actuator 338, in response to the fuel flow decrease commands, selectively moves the flow decrease valve element 336 to either the closed position or an open position. The flow decrease valve actuator 338, similar to the flow increase valve actuator 326, may be implemented using any one of numerous types of actuators, including any one of numerous types of electromechanical, electro-pneumatic, and electro-hydraulic actuators. In the depicted embodiment, however, it is implemented using a spring-loaded, dual-coil solenoid that includes a primary increase valve coil 342-1 and a secondary increase valve coil 342-2.

Having described the fuel metering unit 108 from a structural standpoint, and having generally described its overall function, a more detailed description of its function will now be provided. In doing so, reference should be made to FIGS. 2 and 3, as needed. Moreover, it is initially assumed that the engine control 150 is fully operational to supply fuel flow increase and decrease commands to the flow increase 204 and flow decrease 206 valves, respectively, and that the fuel metering valve 202 in the steady-state position depicted in FIG. 3.

If the engine control 150 determines that fuel flow to the engine combustor 114 needs to increase, it will command the fuel metering unit 108 to increase the area of the variable area flow orifice 208. To do so, the engine control 150 will supply fuel flow increase commands to the flow increase valve 204, and more specifically to the primary coil 328-1 of the flow increase valve actuator 326. Upon receipt of the flow increase commands, the flow increase valve actuator 326 will move the flow increase valve element 324 to an open position. In the open position, hydraulic fluid at the first hydraulic fluid pressure is communicated through the flow increase valve first and second ports 318, 322 to the metering valve third control port 316. As a result, the metering valve element 304 will move in the direction of arrow 344, thereby increasing the area of the variable area flow orifice 208, and concomitantly increasing fuel flow to the combustor 114. When the desired fuel flow rate is achieved, the engine control 150 will cease supplying the flow increase commands to the flow increase valve actuator 326. As a result, the flow increase valve element 324 will return to its closed position, and the fuel metering valve element 304 will remain in a fixed position.

Conversely, if the engine control 150 determines that fuel flow to the engine combustor 114 needs to decrease, it will command the fuel metering unit 108 to decrease the area of the variable area flow orifice 208. To do so, the engine control 150 will supply fuel flow decrease commands to the flow decrease valve 206, and more specifically to the primary coil 342-1 of the flow decrease valve actuator 338. Upon receipt of the flow decrease commands, the flow decrease valve actuator 338 will move the flow decrease valve element 336 to an open position. In the open position, hydraulic fluid at the second hydraulic fluid pressure is communicated through the flow increase valve first and second ports 332, 334 to the metering valve third control port 316. As a result, the metering valve element 304 will move in the direction of arrow 346, thereby decreasing the area of the variable area flow orifice 208, and concomitantly decreasing fuel flow to the combustor 114. When the desired fuel flow rate is achieved, the engine control 150 will cease supplying the flow decrease commands to the flow decrease valve actuator 338. As a result, the flow decrease valve element 336 will return to its closed position, and the fuel metering valve element 304 will remain in a fixed position. It will thus be appreciated that as long as the system pressures remain relatively constant, the position of the fuel metering valve element 304 will remain unchanged.

From the above, it may be appreciated that the metering valve 202 will remain in a fixed position in the unlikely event that the engine control 150 is unable to control the flow increase and flow decrease valves 204, 206. Various events are postulated to result in such an occurrence. For example, it is postulated that electrical power to the engine control 150 may be lost or otherwise become unavailable, or that the engine control 150 itself may become lost or otherwise unavailable, or that one or both of the primary coils 328-1, 342-1 may become lost or otherwise unavailable. No matter which specific postulated event occurs, the system 100 is configured such that, not only will the metering valve 202 "fail fixed," but also to allow a user, such as a pilot, to control fuel flow to the engine combustor 114 via the back-up control 160.

For example, if the pilot wishes to increase fuel flow to the engine combustor 114, then the pilot will supply appropriate input stimuli to the flow increase user interface 164. As noted above, the back-up valve control 160, in response to the supplied input stimuli, will supply fuel flow increase commands to the fuel increase valve 204, and more specifically to the secondary coil 328-2 of the flow increase valve actuator 326. This will cause the metering valve element 304 to move in the direction of arrow 344, thereby increasing the area of the variable area flow orifice 208, and concomitantly increasing fuel flow to the combustor 114. When the desired fuel flow rate is achieved, the user will no longer supply input stimuli to the flow increase user interface 164, the back-up control 160 will cease supplying the fuel flow increase commands to the flow increase valve 204, and the fuel metering valve element 304 will remain in a fixed position.

If the pilot wishes to decrease fuel flow to the engine combustor 114, then the pilot will supply appropriate input stimuli to the flow decrease user interface 162. In response to the supplied input stimuli, the back-up control 160 will supply fuel flow decrease commands to the flow decrease valve 206, and more specifically to the secondary coil 342-2 of the flow decrease valve 206. This will cause the metering valve element 304 to move in the direction of arrow 346, thereby reducing the area of the variable area flow orifice 208, and concomitantly decreasing fuel flow to the combustor 114. When the desired fuel flow rate is achieved, the user will no longer supply input stimuli to the flow decrease user interface 162, the back-up valve control 160 will cease supplying the fuel flow decrease commands to the flow decrease valve 206, and the fuel metering valve element 304 will remain in a fixed position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel metering unit, comprising:
a fuel metering valve adapted to receive a flow of fuel from a fuel source and having a variable area flow orifice through which fuel from the fuel source flows, the fuel metering valve including a first control port, a second control port, and a third control port, the first control port adapted to receive hydraulic fluid at a first hydraulic fluid pressure, the second control port adapted to receive hydraulic fluid at a second hydraulic fluid pressure, the third control port adapted to selectively receive hydraulic fluid at either the first hydraulic fluid pressure or the second hydraulic fluid pressure, the fuel metering valve configured, in response to fluid pressure at the third control port, to selectively adjust the area of the variable area flow orifice;
a flow increase valve in fluid communication with the fuel metering valve and adapted to receive hydraulic fluid at the first hydraulic fluid pressure, the flow increase valve adapted to selectively receive fuel flow increase commands from a primary fuel flow command source and from a secondary fuel flow command source, the flow increase valve responsive to the fuel flow increase commands to selectively supply hydraulic fluid at the first hydraulic fluid pressure to the third control port to thereby increase the area of the variable area flow orifice; and
a flow decrease valve in fluid communication with the fuel metering valve and adapted to receive hydraulic fluid at the second hydraulic fluid pressure, the flow decrease valve adapted to selectively receive fuel flow decrease commands from the primary fuel flow command source and from the secondary fuel flow command source, the flow decrease valve responsive to the fuel flow decrease commands to selectively supply hydraulic fluid at the second hydraulic fluid pressure to the third control port to thereby decrease the area of the variable area flow orifice.

2. The fuel metering unit of claim 1, wherein:
the flow increase valve comprises a flow increase valve element and a flow increase valve actuator, the flow increase valve actuator coupled to the flow increase valve and adapted to selectively receive fuel flow increase commands from the primary fuel flow command source and from the secondary fuel flow command source; and
the flow decrease valve comprises a flow decrease valve element and a flow decrease valve actuator, the flow decrease valve actuator coupled to the flow decrease valve and adapted to selectively receive fuel flow decrease commands from the primary fuel flow command source and from the secondary fuel flow command source.

3. The fuel metering unit of claim 2, wherein:
the flow increase actuator comprises (i) a first flow increase solenoid coil adapted to selectively receive fuel flow increase commands from the primary fuel flow command source and (ii) a second flow increase solenoid coil adapted to selectively receive fuel flow increase commands from the secondary fuel flow command source; and
the flow decrease actuator comprises (i) a first flow decrease solenoid coil adapted to selectively receive fuel flow decrease commands from the primary fuel flow command source and (ii) a second flow decrease solenoid coil adapted to selectively receive fuel flow decrease commands from the secondary fuel flow command source.

4. The fuel metering unit of claim 3, wherein the fuel flow increase commands and the fuel flow decrease commands are each pulse width modulation (PWM) signals.

5. The fuel metering valve of claim 1, wherein the first hydraulic fluid pressure is less than the second hydraulic fluid pressure.

6. The fuel metering unit of claim 1, wherein the fuel metering valve comprises:
 a valve body having an inlet port, an outlet port, the first control port, the second control port, and the third control port, the inlet port adapted to receive the flow of fuel from the fuel source, the first control port in fluid communication with the fail-fixed valve, the second control port adapted to receive the hydraulic fluid at the first pressure from the first hydraulic fluid source; and
 a valve element disposed within the valve body and movable therein to thereby adjust the variable area flow orifice.

7. A gas turbine engine fuel supply system, comprising:
 an engine control operable to selectively supply fuel flow increase commands and fuel flow decrease commands;
 a back-up fuel control operable to selectively supply fuel flow increase commands and fuel flow decrease commands;
 a fuel supply line having an inlet and an outlet, the inlet adapted to receive fuel from a fuel source, the outlet adapted to supply the fuel to a gas turbine engine combustor; and
 a fuel metering unit disposed in flow series in the fuel supply line, the fuel metering responsive to the fuel flow increase commands and the fuel flow decrease commands to control fuel flow from the fuel source to the gas turbine engine combustor, the fuel metering unit comprising:
  a fuel metering valve coupled to receive the flow of fuel from the fuel source and having a variable area flow orifice through which fuel from the fuel source flows, the fuel metering valve including a first control port, a second control port, and a third control port, the first control port adapted to receive hydraulic fluid at a first hydraulic fluid pressure, the second control port adapted to receive hydraulic fluid at a second hydraulic fluid pressure, the third control port adapted to selectively receive hydraulic fluid at either the first hydraulic fluid pressure or the second hydraulic fluid pressure, the fuel metering valve configured, in response to fluid pressure at the third control port, to selectively adjust the area of the variable area flow orifice,
  a flow increase valve in fluid communication with the fuel metering valve and adapted to receive hydraulic fluid at the first hydraulic fluid pressure, the flow increase valve adapted to selectively receive fuel flow increase commands from the engine control and from the back-up fuel control, the flow increase valve responsive to the fuel flow increase commands to selectively supply hydraulic fluid at the first hydraulic fluid pressure to the third control port to thereby increase the area of the variable area flow orifice, and
  a flow decrease valve in fluid communication with the fuel metering valve and adapted to receive hydraulic fluid at the second hydraulic fluid pressure, the flow decrease valve adapted to selectively receive fuel flow decrease commands from the engine control and from the back-up fuel control, the flow decrease valve responsive to the fuel flow decrease commands to selectively supply hydraulic fluid at the second hydraulic fluid pressure to the third control port to thereby decrease the area of the variable area flow orifice.

8. The system of claim 7, wherein the back-up fuel control is adapted to receive input stimuli from a user and is configured, in response thereto, to supply the fuel flow increase commands and the fuel flow decrease commands.

9. The system of claim 8, wherein the back-up fuel control comprises:
 a flow increase user interface adapted to be responsive to the input stimuli; and
 a flow decrease user interface adapted to be responsive to the input stimuli,
 wherein the back-up control unit supplies (i) the fuel flow increase commands when the input stimuli is supplied to the flow increase user interface and (ii) the fuel flow decrease commands when the input stimuli is supplied to the flow decrease user interface.

10. The system of claim 9, wherein the back-up valve control is electrically independent of the engine control.

11. The system of claim 7, wherein the fuel metering valve comprises:
 a valve body having an inlet port, an outlet port, the first control port, the second control port, and the third control port, the inlet port adapted to receive the flow of fuel from the fuel source, the first control port in fluid communication with the fail-fixed valve, the second control port adapted to receive the hydraulic fluid at the first pressure from the first hydraulic fluid source; and
 a valve element disposed within the valve body and movable therein to thereby adjust the variable area flow orifice.

12. The system of claim 7, wherein:
the flow increase valve comprises a flow increase valve element and a flow increase valve actuator, the flow increase valve actuator coupled to the flow increase valve and adapted to selectively receive fuel flow increase commands from the primary fuel flow command source and from the secondary fuel flow command source; and
the flow decrease valve comprises a flow decrease valve element and a flow decrease valve actuator, the flow decrease valve actuator coupled to the flow decrease valve and adapted to selectively receive fuel flow decrease commands from the primary fuel flow command source and from the secondary fuel flow command source.

13. The system of claim 12, wherein:
the flow increase actuator comprises (i) a first flow increase solenoid coil adapted to selectively receive fuel flow increase commands from the primary fuel flow command source and (ii) a second flow increase solenoid coil adapted to selectively receive fuel flow increase commands from the secondary fuel flow command source; and
the flow decrease actuator comprises (i) a first flow decrease solenoid coil adapted to selectively receive fuel flow decrease commands from the primary fuel flow command source and (ii) a second flow decrease solenoid coil adapted to selectively receive fuel flow decrease commands from the secondary fuel flow command source.

14. The system of claim 13, wherein the fuel flow increase commands and the fuel flow decrease commands are each pulse width modulation (PWM) signals.

15. The system of claim 7, wherein the first hydraulic fluid pressure is less than the second hydraulic fluid pressure.

16. A gas turbine engine fuel supply system, comprising:
an engine control operable to selectively supply fuel flow increase commands and fuel flow decrease commands;
a back-up fuel control adapted to receive input stimuli from a user and configured, in response thereto, to selectively supply fuel flow increase commands and fuel flow decrease commands, the back-up fuel control electrically independent of the engine control;
a fuel supply line having an inlet and an outlet, the inlet adapted to receive fuel from a fuel source, the outlet adapted to supply the fuel to a gas turbine engine combustor; and
a fuel metering unit disposed in flow series in the fuel supply line, the fuel metering responsive to the fuel flow increase commands and the fuel flow decrease commands to control fuel flow from the fuel source to the gas turbine engine combustor, the fuel metering unit comprising:
 a fuel metering valve coupled to receive the flow of fuel from the fuel source and having a variable area flow orifice through which fuel from the fuel source flows, the fuel metering valve including a first control port, a second control port, and a third control port, the first control port adapted to receive hydraulic fluid at a first hydraulic fluid pressure, the second control port adapted to receive hydraulic fluid at a second hydraulic fluid pressure, the third control port adapted to selectively receive hydraulic fluid at either the first hydraulic fluid pressure or the second hydraulic fluid pressure and configured, in response to the fluid pressure at the third control port, to selectively adjust the area of the variable area flow orifice,
 a flow increase valve in fluid communication with the fuel metering valve and adapted to receive hydraulic fluid at the first hydraulic fluid pressure, the flow increase valve coupled to receive fuel flow increase commands from the engine control and from the back-up fuel control and configured, in response thereto, to supply hydraulic fluid at the first hydraulic fluid pressure to the third control port to thereby increase the area of the variable area flow orifice, and
 a flow decrease valve in fluid communication with the fuel metering valve and adapted to receive hydraulic fluid at the second hydraulic fluid pressure, the flow decrease valve coupled to receive fuel flow decrease commands from the engine control and from the back-up fuel control and configure, in response thereto, to supply hydraulic fluid at the second hydraulic fluid pressure to the third control port to thereby decrease the area of the variable area flow orifice.

17. The system of claim 16, wherein the back-up fuel control comprises:
a flow increase user interface adapted to be responsive to the input stimuli; and
a flow decrease user interface adapted to be responsive to the input stimuli,
wherein the back-up control unit supplies (i) the fuel flow increase commands when the input stimuli is supplied to the flow increase user interface and (ii) the fuel flow decrease commands when the input stimuli is supplied to the flow decrease user interface.

18. The system of claim 16, wherein the fuel metering valve comprises:
a valve body having an inlet port, an outlet port, the first control port, the second control port, and the third control port, the inlet port adapted to receive the flow of fuel from the fuel source, the first control port in fluid communication with the fail-fixed valve, the second control port adapted to receive the hydraulic fluid at the first pressure from the first hydraulic fluid source; and
a valve element disposed within the valve body and movable therein to thereby adjust the variable area flow orifice.

19. The system of claim 16, wherein:
the flow increase valve comprises a flow increase valve element and a flow increase valve actuator, the flow increase valve actuator coupled to the flow increase valve and adapted to selectively receive fuel flow increase commands from the primary fuel flow command source and from the secondary fuel flow command source;
the flow decrease valve comprises a flow decrease valve element and a flow decrease valve actuator, the flow decrease valve actuator coupled to the flow decrease valve and adapted to selectively receive fuel flow decrease commands from the primary fuel flow command source and from the secondary fuel flow command source;
the flow increase actuator comprises (i) a first flow increase solenoid coil adapted to selectively receive fuel flow increase commands from the primary fuel flow command source and (ii) a second flow increase solenoid coil adapted to selectively receive fuel flow increase commands from the secondary fuel flow command source; and
the flow decrease actuator comprises (i) a first flow decrease solenoid coil adapted to selectively receive fuel flow decrease commands from the primary fuel flow command source and (ii) a second flow decrease solenoid coil adapted to selectively receive fuel flow decrease commands from the secondary fuel flow command source.

20. The system of claim 19, wherein:
the fuel flow increase commands and the fuel flow decrease commands are each pulse width modulation (PWM) signals; and
the first hydraulic fluid pressure is less than the second hydraulic fluid pressure.

* * * * *